(12) United States Patent
Malchikov et al.

(10) Patent No.: US 11,023,863 B2
(45) Date of Patent: Jun. 1, 2021

(54) MACHINE LEARNING RISK ASSESSMENT UTILIZING CALENDAR DATA

(71) Applicant: EMC IP Holding Company LLC, Hopkinton, MA (US)

(72) Inventors: Victor Malchikov, Foster City, CA (US); Leandro E. Diato, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 157 days.

(21) Appl. No.: 16/399,029

(22) Filed: Apr. 30, 2019

(65) Prior Publication Data

US 2020/0349527 A1    Nov. 5, 2020

(51) Int. Cl.
   *G06Q 10/00*       (2012.01)
   *G06Q 10/10*       (2012.01)
   *G06N 20/00*       (2019.01)

(52) U.S. Cl.
   CPC .......... *G06Q 10/1095* (2013.01); *G06N 20/00* (2019.01)

(58) Field of Classification Search
None
See application file for complete search history.

(56) References Cited

U.S. PATENT DOCUMENTS 5,855,006 A * 12/1998 Huemoeller .......... G06Q 10/02
                                             705/5

8,239,498 B2    8/2012   Kilpatrick et al.
8,682,812 B1 *   3/2014   Ranjan ................ H04L 63/1425
                                            706/12

(Continued)

FOREIGN PATENT DOCUMENTS

WO    WO-2010052169 A1 *   5/2010   ........... H04L 63/164

OTHER PUBLICATIONS

Nayot Poolsappasit, Rinku Dewri, and Indrajit Ray (Dynamic Security Risk Management Using Bayesian Attack Graphs, IEEE Transactions on Dependable and Secure Computing, vol. 9, No. 1, Jan./Feb. 2012). (Year: 2012).*

(Continued)

*Primary Examiner* — Hafiz A Kassim
(74) *Attorney, Agent, or Firm* — Ryan, Mason & Lewis, LLP (57) ABSTRACT

Methods, apparatus, and processor-readable storage media for machine learning risk assessment utilizing calendar data are provided herein. An example computer-implemented method includes processing historical calendar data attributed to users on a network; generating, based on the processed historical calendar data and historical user activity data associated with the network, a machine learning user activity model; processing input data, wherein the input data comprise additional user activity data associated with the network attributed to one of the users and additional calendar data temporally related to the additional user activity data; generating a risk assessment output for the user by applying the machine learning user activity model to the processed input data; and providing the risk assessment output to one or more risk management entities within the network for execution of one or more automated actions based on the risk assessment output.

20 Claims, 5 Drawing Sheets

(56) References Cited

U.S. PATENT DOCUMENTS

| | | | | |
|---|---|---|---|---|
| 10,445,738 | B1* | 10/2019 | Waters | G06Q 50/265 |
| 2006/0242154 | A1* | 10/2006 | Rawat | G06F 16/168 |
| 2008/0249793 | A1* | 10/2008 | Angell | G06Q 30/02 |
| | | | | 705/1.1 |
| 2009/0216602 | A1* | 8/2009 | Henderson | G06Q 10/00 |
| | | | | 705/7.41 |
| 2011/0106892 | A1* | 5/2011 | Nelson | G06Q 10/109 |
| | | | | 709/206 |
| 2011/0131514 | A1* | 6/2011 | Alberth, Jr. | G06Q 10/109 |
| | | | | 715/764 |
| 2011/0302169 | A1* | 12/2011 | Brdiczka | G06Q 30/02 |
| | | | | 707/740 |
| 2014/0337751 | A1* | 11/2014 | Lim | G06F 40/279 |
| | | | | 715/744 |
| 2015/0088739 | A1* | 3/2015 | Desai | G06N 5/046 |
| | | | | 705/42 |
| 2015/0294220 | A1* | 10/2015 | Oreif | G06N 5/04 |
| | | | | 706/12 |
| 2015/0339477 | A1* | 11/2015 | Abrams | G06F 21/316 |
| | | | | 726/23 |
| 2016/0086116 | A1* | 3/2016 | Rao | G06F 3/0481 |
| | | | | 705/7.21 |
| 2016/0117466 | A1* | 4/2016 | Singh | G06Q 50/265 |
| | | | | 702/19 |
| 2016/0293133 | A1* | 10/2016 | Dutt | A63F 13/57 |
| 2016/0316420 | A1* | 10/2016 | Mustafa | H04W 12/08 |
| 2016/0342694 | A1* | 11/2016 | Allen | H04L 67/22 |
| 2017/0140341 | A1* | 5/2017 | Gordon | G06Q 20/24 |
| 2017/0169397 | A1* | 6/2017 | Castelli | G06Q 10/1095 |
| 2017/0286671 | A1* | 10/2017 | Chari | G06F 21/552 |
| 2017/0289168 | A1* | 10/2017 | Bar | H04L 63/0853 |
| 2017/0293515 | A1* | 10/2017 | Brew | G06F 17/18 |
| 2018/0374375 | A1* | 12/2018 | Doucette | G06F 40/30 |
| 2019/0066021 | A1* | 2/2019 | Tang | G06K 9/6234 |
| 2019/0116193 | A1* | 4/2019 | Wang | H04L 63/1416 |
| 2019/0258807 | A1* | 8/2019 | DiMaggio | G06N 20/00 |
| 2019/0319961 | A1* | 10/2019 | Levy | H04L 41/20 |
| 2019/0362248 | A1* | 11/2019 | Rogynskyy | G06F 16/2379 |
| 2020/0058068 | A1* | 2/2020 | Gandhi | G06N 7/005 |
| 2020/0065513 | A1* | 2/2020 | Sridharan | G06F 21/629 |
| 2020/0068031 | A1* | 2/2020 | Kursun | H04W 24/08 |
| 2020/0236120 | A1* | 7/2020 | Monteil | G06N 20/00 |

OTHER PUBLICATIONS

Richard Chow, Markus Jakobsson, Ryusuke Masuoka, Authentication in the Clouds: A Framework and its Application to Mobile Users, CCSW' 10, Oct. 8, 2010). (Year: 2010).*

Yang Jun, Yang Ming, Wang Wenlin, Li Fengjun (Online application of a risk management system for risk assessment and monitoring at NPPs, Nuclear Engineering and Design, 305 (2016) 200-212). (Year: 2016).*

Joe Tullio, Jeremy Goecks, Elizabeth D. Mynatt, David H. Nguyen (Augmenting Shared Personal Calendars, UIST'02, Oct. 27-30, 2002, Paris, France)). (Year: 2002).*

* cited by examiner

MACHINE LEARNING RISK ASSESSMENT UTILIZING CALENDAR DATA

FIELD

The field relates generally to information processing systems, and more particularly to techniques for providing security in such systems.

BACKGROUND

Risk management techniques attempt to provide assurance that only appropriate users are gaining access to protected resources. Conventional approaches for determining risk associated with a user action on a network typically include creating models of user behavior and computing risk scores based on how closely current behavior aligns with the behavior expected by the models. However, the accuracy of the user behavior models and risk score calculations impacts security considerations for protected resources, and data relied upon for creating the user behavior models can be limited in quantity and/or relevance for risk assessment.

SUMMARY

Illustrative embodiments of the disclosure provide techniques for machine learning risk assessment utilizing calendar data. An exemplary computer-implemented method includes processing historical calendar data attributed to users on a network and generating, based at least in part on the processed historical calendar data and historical user activity data associated with the network, one or more machine learning user activity models. The method also includes processing input data, wherein the input data include additional user activity data associated with the network attributed to at least one of the users and additional calendar data temporally related to the additional user activity data. Additionally processing the input data includes processing the additional user activity data from one or more data structures associated with network monitoring to one or more data structures associated with the one or more machine learning user activity models, and processing the additional calendar data from one or more data structures associated with one or more user calendar applications to the one or more data structures associated with the one or more machine learning user activity models. Further, the method also includes generating a risk assessment output for the at least one user by applying at least one of the machine learning user activity models to the processed input data, and providing the risk assessment output to one or more risk management entities within the network for execution of one or more automated actions based at least in part on the risk assessment output.

Illustrative embodiments can provide significant advantages relative to conventional risk management techniques. For example, challenges associated with limited quantities of relevant data for user behavior model creation are overcome through analyzing various forms of calendar application content to generate and/or enhance machine learning user behavior models and risk score calculations.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
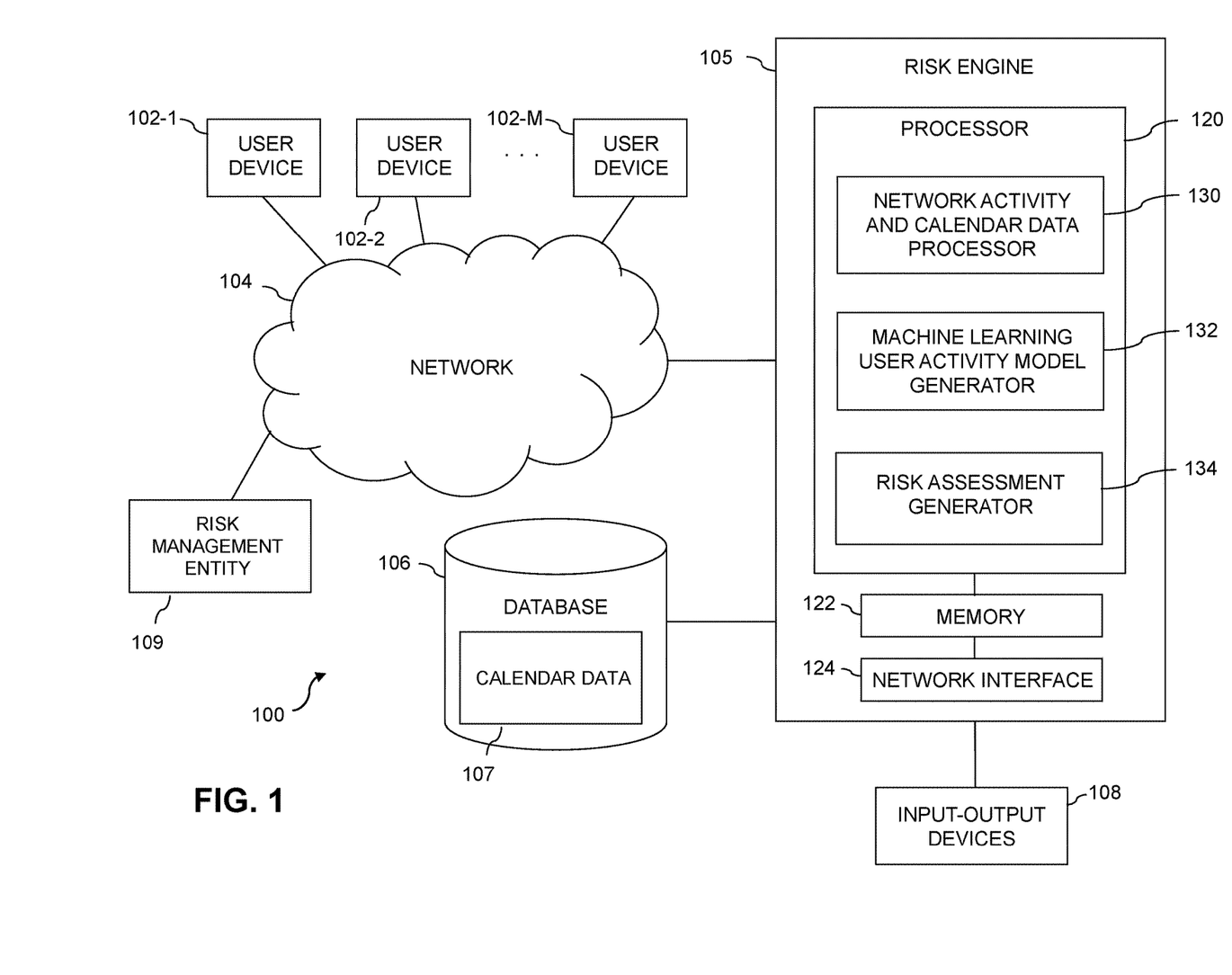
FIG. 1 shows an information processing system configured for machine learning risk assessment utilizing calendar data in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is risk engine 105. Further, also coupled to network 104 is risk management entity 109, which can execute one or more automated security-related actions based at least in part on a risk assessment output generated by risk engine 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the risk engine 105 can have an associated database 106 configured to store calendar data 107 pertaining to calendar application content, which comprise, for example, event participant information, event organizer information, event start time information, event end time information, event date information, event location information, event description information, event priority information, etc.

The database 106 in the present embodiment is implemented using one or more storage systems associated with the risk engine 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the risk engine 105 are input-output devices 108, which illustratively comprise keyboards, displays or other types of input-output devices in any combination. Such input-output devices can be used, for example, to support one or more user interfaces to the risk engine 105, as well as to support communication between the risk engine 105 and other related systems and devices not explicitly shown.

The risk engine 105 in the FIG. 1 embodiment is assumed to be implemented using at least one processing device. Each such processing device generally comprises at least one processor and an associated memory, and implements one or more functional modules for controlling certain features of the risk engine 105.

More particularly, the risk engine 105 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the risk engine 105 to communicate over the network 104 with the user devices 102, and illustratively comprises one or more conventional transceivers.

The processor 120 further comprises a network activity and calendar data processor 130, a machine learning user activity model generator 132, and a risk assessment generator 134.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the network activity and calendar data processor 130, machine learning user activity model generator 132, and risk assessment generator 134 may be implemented at least in part in the form of software that is stored in memory 122 and executed by processor 120.

It is to be understood that the particular set of elements shown in FIG. 1 for determining user risk scores utilizing calendar data involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing network activity and calendar data processor 130, machine learning user activity model generator 132, and risk assessment generator 134 of an example risk engine 105 in computer network 100 will be described in more detail with reference to the flow diagram of FIG. 3.

Accordingly, at least one embodiment of the invention includes significantly modifying the paradigm of risk score calculation by leveraging additional sources of data which improves risk score calculation accuracy. As detailed herein, determining when to increase a level of authentication required to access a protected resource can involve evaluating many unique data points against one or more policy configurations. In order to determine the most accurate level of authentication, a risk engine can evaluate various types of questions associated with the action or event, such as, for example: How sensitive is the protected resource that the user is attempting to access? Is the user acting from a trusted device? Is the user acting within a trusted network? Is the user attempting to access the protected resource from a trusted location? Is the user attempting to access the protected resource during typical work hours?

One of the challenges resulting from conventional risk assessment approaches is incorrectly calculating a presented risk, which negatively impacts user experience and/or security vulnerabilities. As such, one or more embodiments include implementing calendar data into risk assessments, which provide insight into user activity and enable the generation of more accurate and granular machine learning behavioral models. By way merely of illustration, in an example embodiment, a machine learning model can be designed and generated to evaluate an authentication request during scheduled meetings. Over time, the machine learning model will learn the likelihood of particular requests occurring during scheduled meetings. For instance, if a user routinely accesses a given protected resource during a scheduled meeting, the machine learning model will learn that such activity is normal behavior for the user, and the machine learning model will not classify the activity as anomalous. If the user has never accessed a given protected resource while in a particularly type of meeting, attempts to access the given protected resource during such a meeting will be deemed abnormal by the machine learning model.

Accordingly, one or more embodiments include improving risk score calculation accuracy by providing more context to the risk engine when analyzing user activity by considering and/or incorporating calendar data corresponding to scheduled events. In at least one embodiment, usage of natural language processing techniques provides further insight and/or granularity to the risk engine by extrapolating information about the types of protected resources that might or should not be accessed at a particular time by a particular user.

As used herein, a risk score refers to a value derived from analyzing an event through developed models and risk score algorithms. A risk engine refers to a software solution that detects, analyzes, scores, and/or manages user activity within one or more networks. Additionally, a pattern refers to common user activity and/or behavior detected over time, and user-based analytics refers to the application of one or more algorithms and statistical analyses to detect meaningful anomalies in user activity. Also, multi-factor authentication refers to a method of confirming a user's identity after the user successfully provides two or more pieces of requested information. Further, as used herein, policy configurations refer to configurations that govern access control to system and network resources, and natural language processing (NLP) refers to a field within computer science that is focused on enabling computers to understand and interpret context derived from human language.

Figure 2:
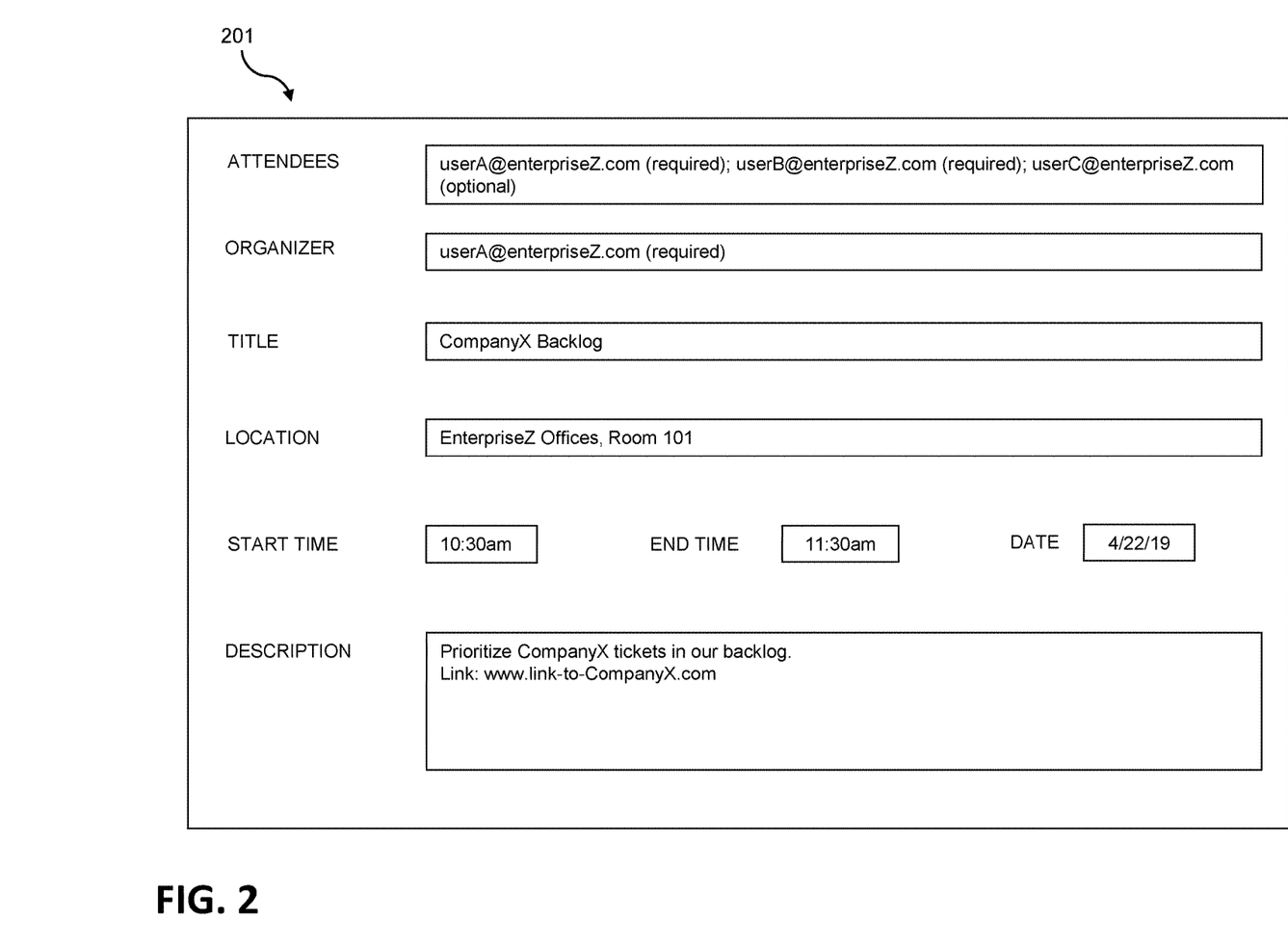
FIG. 2 shows an example calendar application entry containing various forms of calendar data utilized in an illustrative embodiment.

FIG. 2 shows an example calendar application entry 201 containing various forms of calendar data utilized in an illustrative embodiment. By way of illustration, FIG. 2 depicts an example calendar application entry 201, which can be accessed and/or obtained via risk engine 105 via an application programming interface (API) associated with a calendar application on a user device 102, and/or via database 106. In one or more such embodiments, the calendar data can be processed from one or more data structures associated with the user device 102 calendar application and/or database 106 to the one or more data structures associated with one or more machine learning user activity models of the risk engine 105.

As also depicted in FIG. 2, the example calendar application entry 201 includes various types of information pertaining to a scheduled calendar event (e.g., a meeting), wherein such information can be utilized by the risk engine as further detailed herein. For example, the calendar application entry 201 includes information pertaining to participant and/or attendee data (that is, who will participate in the event), organizer data (that is, who scheduled the event), start time data, end time data, date data, location data (that is, where the event will take place), title data (that is, a general description of the event), and notes/description data (e.g., details pertaining to the event). In one or more embodiments, a calendar application entry can additionally include priority data (that is, a level of importance of the event for participants (e.g., optional, required, etc.)).

By way of illustration, the following use cases detail one or more example embodiments, wherein such embodiments evaluate items of calendar data on an individual basis. However, it is to be appreciated that one or more embodiments can additionally include considering and/or evaluating multiple types of calendar data within each instance of a machine learning user activity model application.

Consider a first use case that includes using event location data to assess risk. In such a use case, when a user attempts to access a protected resource, at least one embodiment includes determining from where the request originates (geographically). Knowing this information, the risk engine can determine if there exists a corresponding calendar event having the same specified location and make one or more machine learning-based assumptions when evaluating the risk involved with the user's attempt to access the protected resource. Such a determination can be factored into the machine learning model through features such as, for example, whether the authentication location and meeting location (if present) match (a binary determination), the distance between the authentication location and the calendar-specified meeting location (a variable numeric determination) the number of instances of this meeting, at this location, in the past X months (i.e., determining if the meeting is a recurring meeting at the same place, allowing the machine learning model to learn location recurrence), the average distance between the authentication location and the calendar-specified meeting location over the last X month or last Y meetings, etc.

In addition to direct incorporation into the machine learning model, location information from the calendar data can be utilized as an adjustment factor on the model-computed risk score. For example, such an adjustment factor can reduce a risk score by X points or Y % if the locations match, can increase a risk score by X points or Y % if locations do not match, can make no change to the risk score if the event location is not specified in the calendar data, can reduce the risk score by X points or Y % if the location is a dial-in or web conferencing address, etc.

Consider a second use case that includes using an event time to assess risk. In such a use case, when a user attempts to access a protected resource, the risk engine can evaluate the timestamp of the attempt for context. Knowing this information, a machine learning model can consider this as an extension of the user's work hours. Such information can be factored into the machine learning model through determinations such as, for example, whether the time of the meeting falls within the user's work hours (a binary determination), and the time gap between the authentication time and the nearest calendar event (if not during a meeting). This would determine if authentications occur before or after a meeting, even if the meeting is not during regular work hours (a variable numeric determination). Additional related determinations can include, for example, the number of instances of this meeting, at this time, in the past X months (i.e., is it recurring, allowing the machine learning model to learn time recurrence and likelihood of attendance), and/or the average time gap between the authentication time and the calendar-specified meeting time over the last X months or the last Y meetings (i.e., does the user typically perform an authentication action just prior to or just after this meeting).

In addition to direct incorporation into the machine learning model, time information from calendar data can be utilized as an adjustment factor on the model-computed risk score. For example, such an adjustment factor can reduce the risk score by X points or Y % if authentication occurs during a calendar event (i.e., the user is working), and can cancel off-hours risk adjustment if authentication occurs within X minutes of a calendar event.

Consider a third use case that includes incorporating event data with hyperlinks to protected resources. In such a use case, when a user schedules an event, the user can enter additional information related to the event. Analyzing calendar data for hyperlinks can yield information about references to applications that match protected policy applications. Such information can be factored into the machine learning model through determinations such as, for example, whether the protected resource being accessed is the same resource included in the hyperlink (a binary determination) or whether the protected resource being accessed is sufficiently similar and/or close to the resource included in the hyperlink (a variable edit distance determination, a domain comparison, a variable depth of matching domain determination, etc.). Additional determinations can include, for example, whether the meeting is part of a series and whether the hyperlink exists in every instance of the series, the number of instances of the meeting with links to protected resources in the past X months (i.e., determining if the meeting is a recurring meeting at the same time, allowing the machine learning model to learn recurrence), and the average number of authentication requests during the meeting to access protected resources that are referenced in the meeting over the last X months or the last Y meetings.

In addition to direct incorporation into the machine learning model, hyperlink references from a calendar can be utilized as an adjustment factor on the model-computed risk score. For example, such an adjustment factor can reduce a risk score by X points or Y % if the user requested access to a protected application that was referenced via a hyperlink in a scheduled event within the time frame of the calendar event (or within a few minutes of the event), can cancel an increase in the risk score that might be due to a rare resource access if the resource in question is included in a hyperlink in the meeting calendar data, can increase the risk score by X points or Y % if the user attempts to access a protected resources not associated with content derived from the calendar event.

Additionally, consider a fourth use case that includes processing event/calendar data with NLP techniques. In such a use case, when a user schedules an event, the user can enter additional information related to the event. In one or more embodiments, analyzing calendar data (such as title and description text) using NLP techniques yields additional data for the risk engine to leverage. Such additional data can be factored into the machine learning model through determinations such as, for example, whether the event description references the protected resource being accessed (a binary determination) or whether the event description references something similar to the protected resource (e.g., a variable edit distance determination), the predicted overlap between the event description and the protected resource name (a variable determination of likelihood of a match), the number of instances of the event/meeting with NLP-derived reference(s) to protected resources in the past X months (e.g., determining whether the meeting is a recurring meeting at the same time, allowing the machine learning model to learn recurrence), and/or the average number of authentication requests to access protected resources that are linked to NLP derived references to protected resources in the calendar-specified event/meeting over the last X month or last Y meetings.

In addition to direct incorporation into the machine model, NLP-derived information from calendar data can be utilized as an adjustment factor on the model-computed risk score. For example, such an adjustment factor can reduce a risk score by X points or Y % if the user requested access to a protected resource that was associated with NLP-derived reference in calendar data within the time frame of the scheduled event, and/or can increase a risk score by X points or Y % if the user attempts to access a protected resource that is not associated with content derived from calendar data.

For example, assume that a product manager in an enterprise creates a calendar event that contains the following description "Team meeting to do backlog grooming." This description can be analyzed using NLP techniques to gain insight about the type of protected resources that might be accessed during this event. Keywords such as, for example, "backlog grooming" can be associated with reviewing and prioritizing project goals, and such information can be analyzed and used by the risk engine. Knowing that an event references a protected resource and then an attendee/participant of the event attempts to access the referenced protected resource can enable the risk engine to make a more granular and/or accurate risk assessment.

Further, consider a fifth use case, which includes using event participant data to analyze risk. In such a use case, when a user schedules an event, there can be one or more additional participants identified for the event. Without any additional context-related information about the event, at least one embodiment can include performing one or more risk calculations. Such calculations can be factored into the machine learning model through determinations such as, for example, the number of instances of meeting participants accessing protected resources during the scheduled meeting time in the past X months (e.g., determining if the meeting is a recurring meeting at the same time, allowing the model to learn recurrence), the average number of instances of meeting participants accessing protected resources during the calendar-specified meeting over the last X months or last Y meetings, whether the protected resource being accessed is common to the event participants, even if otherwise rare, etc.

In addition to direct incorporation into the machine learning model, temporal information from calendar data can be utilized as an adjustment factor on the model-computed risk score. For example, such an adjustment factor can reduce a risk score by X points or Y % if the user requested access to a protected resource that was accessed by other meeting participants based on the calendar data.

For example, assume that a product manager schedules a re-occurring event, and the calendar information for the event includes a limited amount of information (e.g., limited to time information and participant information). Unbeknownst to the risk engine, this scheduled event is a backlog grooming event wherein the participants use a protected resource. Over time, a machine learning model is developed to determine one or more patterns wherein protected resources are successfully accessed by the same group of people at approximately the same time during a scheduled event. In at least one embodiment, a threshold can also be applied such that, when the threshold is met, the risk associated with access of the corresponding protected resource is reduced for other event participants because it can be deemed as expected behavior for the duration of scheduled event.

Also, in one or more embodiments, overlapping scheduled events can fall under additional scrutiny and potentially have less weight given to risk score calculations. In such an embodiment, user-provided priority information can be leveraged to determine which event (among overlapping events) the user is likely to attend based on priority differences.

Figure 3:
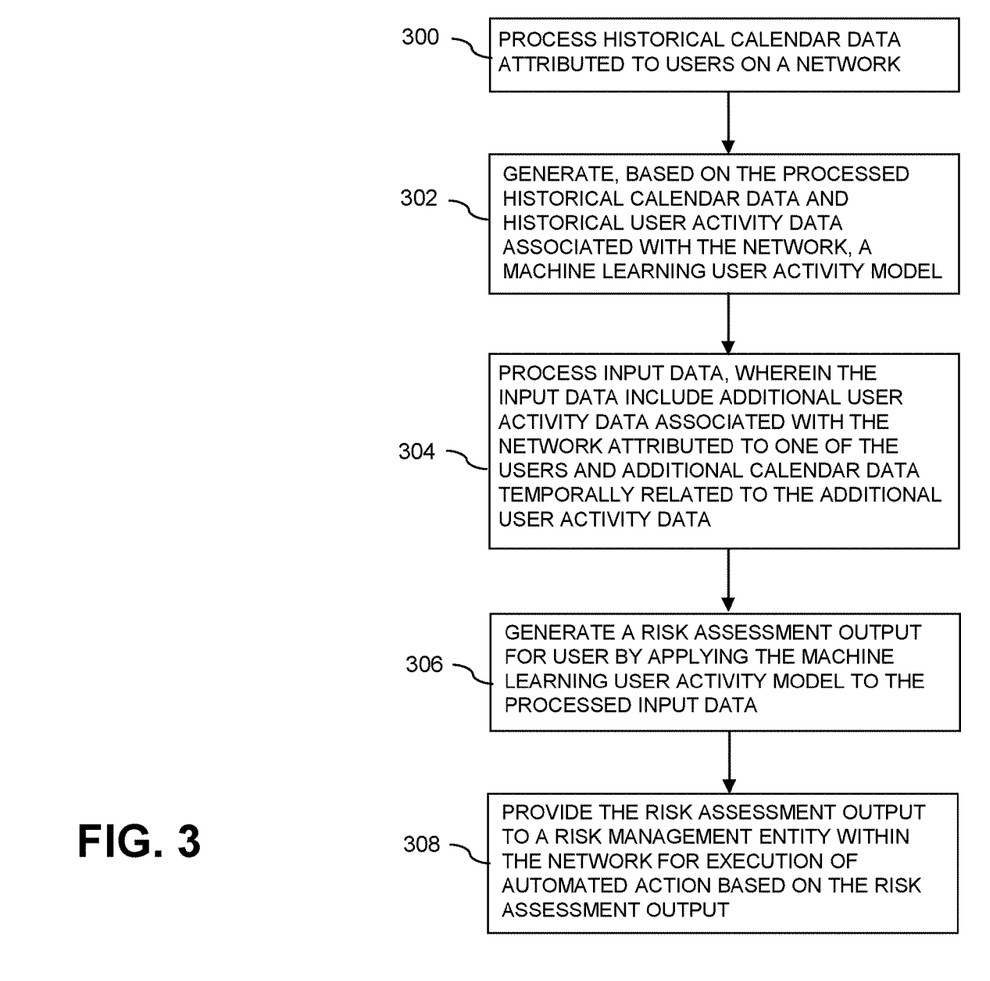
FIG. 3 is a flow diagram of a process for machine learning risk assessment utilizing calendar data in an illustrative embodiment.

FIG. 3 is a flow diagram of a process for machine learning risk assessment utilizing calendar data in an illustrative embodiment. It is to be understood that this particular process is only an example, and additional or alternative processes can be carried out in other embodiments.

In this embodiment, the process includes steps 300 through 308. These steps are assumed to be performed by the processor 120 utilizing its modules 130, 132 and 134.

Step 300 includes processing historical calendar data attributed to users on a network. In at least one embodiment, processing the historical calendar data includes applying one or more natural language processing techniques to the historical calendar data. Step 302 includes generating, based at least in part on the processed historical calendar data and historical user activity data associated with the network, one or more machine learning user activity models.

Step 304 includes processing input data, wherein the input data comprise additional user activity data associated with the network attributed to at least one of the users and additional calendar data temporally related to the additional user activity data. Processing the input data includes processing the additional user activity data from one or more data structures associated with network monitoring to one or more data structures associated with the one or more machine learning user activity models. Processing the input data also includes processing the additional calendar data from one or more data structures associated with one or more user calendar applications to the one or more data structures associated with the one or more machine learning user activity models. In one or more embodiments, processing the additional calendar data includes applying one or more natural language processing techniques to the additional calendar data, thereby determining one or more portions of the additional calendar data to process to the one or more data structures associated with the one or more machine learning user activity models. Further, in at least one embodiment processing the input data includes implementing an application programming interface associated with a risk engine.

Step 306 includes generating a risk assessment output for the at least one user by applying at least one of the machine learning user activity models to the processed input data. In one or more embodiments, generating the risk assessment output includes performing one or more static calendar data-related determinations by applying the at least one machine learning user activity model to one or more binary aspects of the processed additional calendar data. Also, in at least one embodiment, the risk assessment output includes identification of one or more protected resources accessed at a particular time by the at least one user, and a risk level associated therewith.

Step 308 includes providing the risk assessment output to one or more risk management entities within the network for execution of one or more automated actions based at least in part on the risk assessment output.

The techniques depicted in FIG. 3 can additionally include modifying the risk assessment output by applying an adjustment factor to the risk assessment output, wherein the adjustment factor is based at least in part on performing one or more dynamic calendar data-related determinations by applying the at least one machine learning user activity model to one or more variable aspects of the processed additional calendar data. In one or more embodiments, modifying the risk assessment output by applying the adjustment factor to the risk assessment output includes increasing a risk level associated with the risk assessment output by a given amount or decreasing a risk level associated with the risk assessment output by a given amount, based at least in part on the one or more dynamic calendar data-related determinations.

Additionally, in at least one embodiment, the historical calendar data and/or the additional calendar data include participant information for a scheduled event, organizer information for a scheduled event, start time information for a scheduled event, end time information for a scheduled event, date information for a scheduled event, location information for a scheduled event, priority information for a scheduled event, and/or one or more hyperlinks to one or more protected resources. Further, the techniques depicted in FIG. 3 can also include applying distinct weights to overlapping events in the additional calendar data, wherein the distinct weights are based at least in part on priority information derived from the additional calendar data.

Accordingly, the particular processing operations and other functionality described in conjunction with the flow diagram of FIG. 3 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to analyze calendar application content to generate and/or enhance machine learning user behavior models and calculate improved and/or more accurate risk assessments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of a computer system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
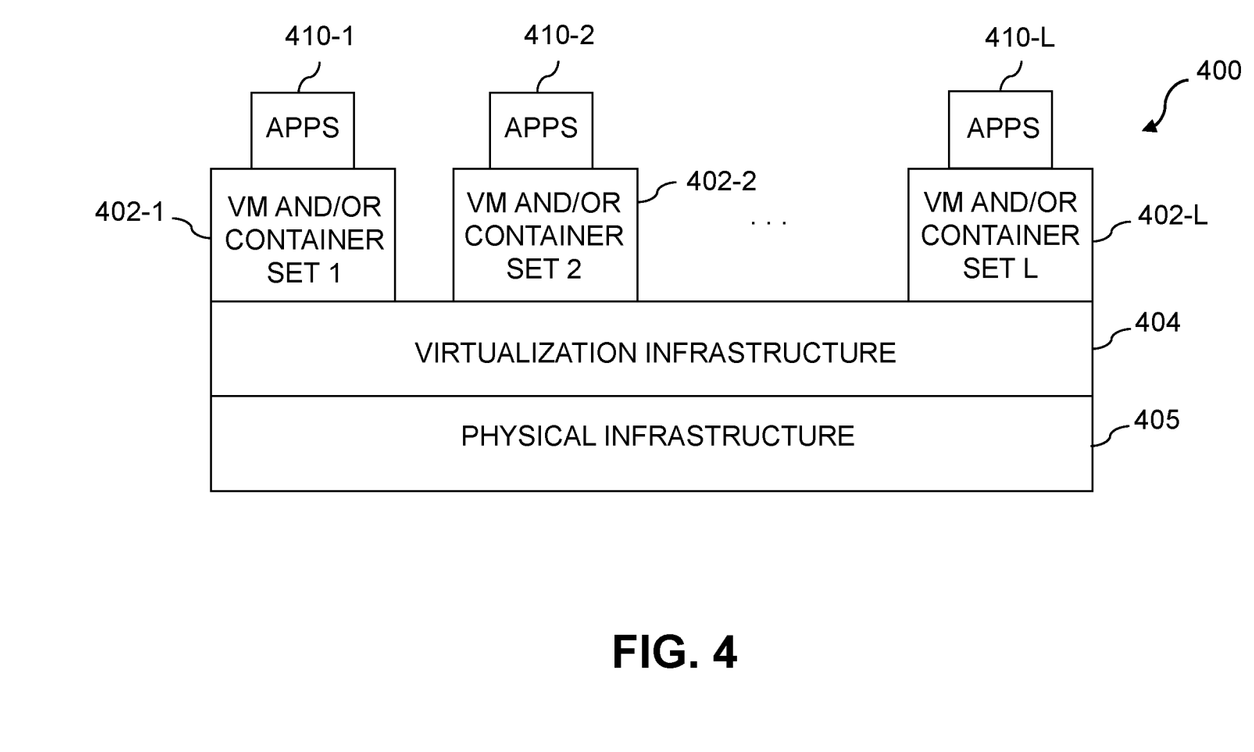
FIGS. 4 and 5 show examples of processing platforms that may be utilized to implement at least a portion of an information processing system in illustrative embodiments.
Figure 5:
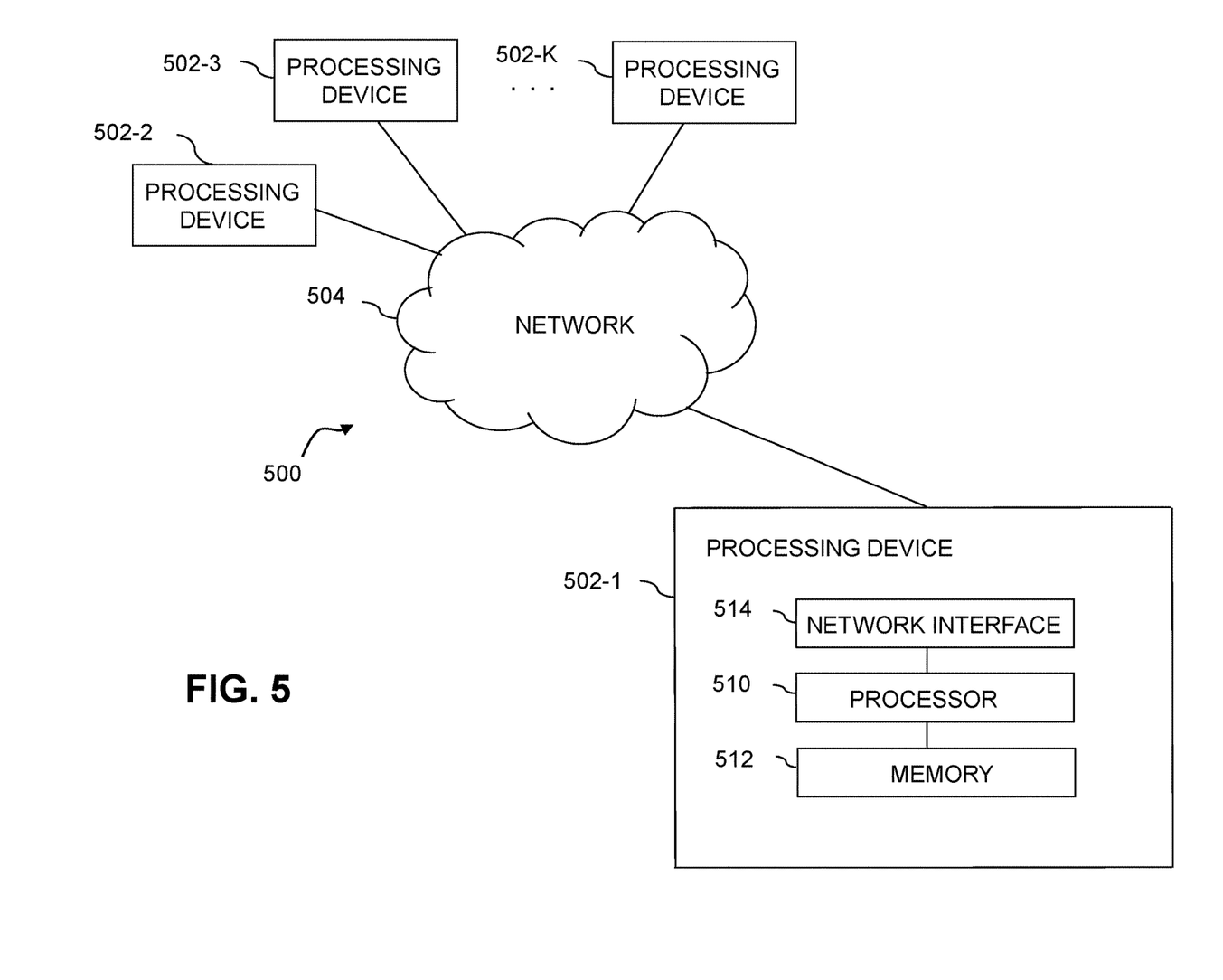

FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

An example of a hypervisor platform used to implement a hypervisor within the virtualization infrastructure 404 is the VMware® vSphere® which has an associated virtual infrastructure management system such as the VMware® vCenter™. The underlying physical machines comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 comprises a microprocessor, a microcontroller, an application-specific integrated circuit (ASIC), a field-programmable gate array (FPGA) or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
processing historical calendar data attributed to users on a network;
generating, based at least in part on the processed historical calendar data and historical user activity data associated with the network, one or more machine learning user activity models;
processing input data, wherein the input data comprise additional user activity data associated with the network attributed to at least one of the users and additional calendar data temporally related to the additional user activity data, wherein processing the input data comprises:
   processing the additional user activity data from one or more data structures associated with network monitoring to one or more data structures associated with the one or more machine learning user activity models, wherein the additional user activity data comprises data related to a number of times at least one user accesses one or more network locations associated with one or more particular hyperlinks;
   performing a network domain determination to authenticate that the one or more particular hyperlinks exist with links to protect the one or more network locations;
   processing the additional calendar data from one or more data structures associated with one or more user calendar applications to the one or more data structures associated with the one or more machine learning user activity models; and
   applying distinct weights to overlapping events in the additional calendar data, wherein the distinct weights are based at least in part on priority information derived from the additional calendar data, and wherein the priority information represents a level of importance of the overlapping events for the at least one user;
generating a risk assessment output for the at least one user by applying at least one of the machine learning user activity models to the processed input data; and
providing the risk assessment output to one or more risk management entities within the network for execution of one or more automated actions based at least in part on the risk assessment output;
wherein the method is performed by at least one processing device comprising a processor coupled to a memory.

2. The computer-implemented method of claim 1, wherein generating the risk assessment output comprises performing one or more static calendar data-related determinations by applying the at least one machine learning user activity model to one or more binary aspects of the processed additional calendar data.

3. The computer-implemented method of claim 1, further comprising:
modifying the risk assessment output by applying an adjustment factor to the risk assessment output, wherein the adjustment factor is based at least in part on performing one or more dynamic calendar data-related determinations by applying the at least one machine learning user activity model to one or more variable aspects of the processed additional calendar data.

4. The computer-implemented method of claim 3, wherein modifying the risk assessment output by applying the adjustment factor to the risk assessment output comprises increasing a risk level associated with the risk assessment output by a given amount or decreasing a risk level associated with the risk assessment output by a given amount, based at least in part on the one or more dynamic calendar data-related determinations.

5. The computer-implemented method of claim 1, wherein processing the additional calendar data comprises applying one or more natural language processing techniques to the additional calendar data, thereby determining one or more portions of the additional calendar data to process to the one or more data structures associated with the one or more machine learning user activity models.

6. The computer-implemented method of claim 1, wherein processing the historical calendar data comprises applying one or more natural language processing techniques to the historical calendar data.

7. The computer-implemented method of claim 1, wherein at least one of the historical calendar data and the additional calendar data comprise at least one of participant information for a scheduled event, organizer information for a scheduled event, start time information for a scheduled event, end time information for a scheduled event, date information for a scheduled event, location information for a scheduled event, priority information for a scheduled event, and one or more hyperlinks to one or more protected resources.

8. The computer-implemented method of claim 1, wherein processing the input data comprises implementing an application programming interface associated with a risk engine.

9. The computer-implemented method of claim 1, wherein the risk assessment output comprises identification of one or more protected resources accessed at a particular time by the at least one user, and a risk level associated therewith.

10. A non-transitory processor-readable storage medium having stored therein program code of one or more software programs, wherein the program code when executed by at least one processing device causes the at least one processing device:
to process historical calendar data attributed to users on a network;
to generate, based at least in part on the processed historical calendar data and historical user activity data associated with the network, one or more machine learning user activity models;
to process input data, wherein the input data comprise additional user activity data associated with the network attributed to at least one of the users and additional calendar data temporally related to the additional user activity data, wherein processing the input data comprises:
 processing the additional user activity data from one or more data structures associated with network monitoring to one or more data structures associated with the one or more machine learning user activity models, wherein the additional user activity data comprises data related to a number of times at least one user accesses one or more network locations associated with one or more particular hyperlinks;
 performing a network domain determination to authenticate that the one or more particular hyperlinks exist with links to protect the one or more network locations;
 processing the additional calendar data from one or more data structures associated with one or more user calendar applications to the one or more data structures associated with the one or more machine learning user activity models; and
 applying distinct weights to overlapping events in the additional calendar data, wherein the distinct weights are based at least in part on priority information derived from the additional calendar data, and wherein the priority information represents a level of importance of the overlapping events for the at least one user;
to generate a risk assessment output for the at least one user by applying at least one of the machine learning user activity models to the processed input data; and
to provide the risk assessment output to one or more risk management entities within the network for execution of one or more automated actions based at least in part on the risk assessment output.

11. The non-transitory processor-readable storage medium of claim 10, wherein generating the risk assessment output comprises performing one or more static calendar data-related determinations by applying the at least one machine learning user activity model to one or more binary aspects of the processed additional calendar data.

12. The non-transitory processor-readable storage medium of claim 10, wherein the program code further causes the at least one processing device:
to modify the risk assessment output by applying an adjustment factor to the risk assessment output, wherein the adjustment factor is based at least in part on performing one or more dynamic calendar data-related determinations by applying the at least one machine learning user activity model to one or more variable aspects of the processed additional calendar data.

13. The non-transitory processor-readable storage medium of claim 12, wherein modifying the risk assessment output by applying the adjustment factor to the risk assessment output comprises increasing a risk level associated with the risk assessment output by a given amount or decreasing a risk level associated with the risk assessment output by a given amount, based at least in part on the one or more dynamic calendar data-related determinations.

14. The non-transitory processor-readable storage medium of claim 10, wherein processing the additional calendar data comprises applying one or more natural language processing techniques to the additional calendar data, thereby determining one or more portions of the additional calendar data to process to the one or more data structures associated with the one or more machine learning user activity models.

15. An apparatus comprising:
at least one processing device comprising a processor coupled to a memory;
the at least one processing device being configured:
 to process historical calendar data attributed to users on a network;
 to generate, based at least in part on the processed historical calendar data and historical user activity data associated with the network, one or more machine learning user activity models;
 to process input data, wherein the input data comprise additional user activity data associated with the network attributed to at least one of the users and additional calendar data temporally related to the additional user activity data, wherein processing the input data comprises:
  processing the additional user activity data from one or more data structures associated with network monitoring to one or more data structures associated with the one or more machine learning user activity models, wherein the additional user activity data comprises data related to a number of times at least one user accesses one or more network locations associated with one or more particular hyperlinks;
  performing a network domain determination to authenticate that the one or more particular hyperlinks exist with links to protect the one or more network locations;
  processing the additional calendar data from one or more data structures associated with one or more user calendar applications to the one or more data structures associated with the one or more machine learning user activity models; and
  applying distinct weights to overlapping events in the additional calendar data, wherein the distinct weights are based at least in part on priority information derived from the additional calendar data, and wherein the priority information represents a level of importance of the overlapping events for the at least one user;

to generate a risk assessment output for the at least one user by applying at least one of the machine learning user activity models to the processed input data; and to provide the risk assessment output to one or more risk management entities within the network for execution of one or more automated actions based at least in part on the risk assessment output.

16. The apparatus of claim 15, wherein generating the risk assessment output comprises performing one or more static calendar data-related determinations by applying the at least one machine learning user activity model to one or more binary aspects of the processed additional calendar data.

17. The apparatus of claim 15, wherein the at least one processing device is further configured:

to modify the risk assessment output by applying an adjustment factor to the risk assessment output, wherein the adjustment factor is based at least in part on performing one or more dynamic calendar data-related determinations by applying the at least one machine learning user activity model to one or more variable aspects of the processed additional calendar data.

18. The apparatus of claim 17, wherein modifying the risk assessment output by applying the adjustment factor to the risk assessment output comprises increasing a risk level associated with the risk assessment output by a given amount or decreasing a risk level associated with the risk assessment output by a given amount, based at least in part on the one or more dynamic calendar data-related determinations.

19. The apparatus of claim 15, wherein processing the additional calendar data comprises applying one or more natural language processing techniques to the additional calendar data, thereby determining one or more portions of the additional calendar data to process to the one or more data structures associated with the one or more machine learning user activity models.

20. The apparatus of claim 15, wherein processing the input data comprises implementing an application programming interface associated with a risk engine.

* * * * *